US012617041B2

(12) United States Patent
Ortner et al.

(10) Patent No.: US 12,617,041 B2
(45) Date of Patent: May 5, 2026

(54) METHOD AND APPARATUS FOR FILAMENTATION OF WORKPIECES NOT HAVING A PLAN-PARALLEL SHAPE, AND WORKPIECE PRODUCED BY FILAMENTATION

(71) Applicant: SCHOTT AG, Mainz (DE)

(72) Inventors: Andreas Ortner, Gau-Algesheim (DE); Fabian Wagner, Mainz (DE); Albrecht Seidl, Niedernberg (DE); Frank-Thomas Lentes, Bingen (DE)

(73) Assignee: SCHOTT AG, Mainz (DE)

( * ) Notice: Subject to any disclaimer, the term of this patent is extended or adjusted under 35 U.S.C. 154(b) by 283 days.

(21) Appl. No.: 17/478,110

(22) Filed: Sep. 17, 2021

(65) Prior Publication Data

US 2022/0001496 A1     Jan. 6, 2022

Related U.S. Application Data

(60) Division of application No. 15/945,992, filed on Apr. 5, 2018, now Pat. No. 11,148,231, which is a
(Continued)

(30) Foreign Application Priority Data

Oct. 5, 2015     (DE) .......................... 102015116846.4

(51) Int. Cl.
B23K 26/53          (2014.01)
B23K 26/042         (2014.01)
(Continued)

(52) U.S. Cl.
CPC ............ B23K 26/53 (2015.10); B23K 26/042 (2015.10); B23K 26/046 (2013.01);
(Continued)

(58) Field of Classification Search
CPC .. B23K 26/53; B23K 26/042; B23K 26/0624; B23K 26/351; B23K 26/046; B23K 26/0884
(Continued)

(56) References Cited

U.S. PATENT DOCUMENTS 6,563,130 B2     5/2003   Dworkowski
6,677,553 B2     1/2004   Matsumoto
(Continued)

FOREIGN PATENT DOCUMENTS

CN          2907485          6/2007
CN          101244523        8/2008
(Continued)

OTHER PUBLICATIONS

JP2008209299 (Year: 2023).*
(Continued)

*Primary Examiner* — Steven W Crabb
(74) *Attorney, Agent, or Firm* — Ruggiero McAllister & McMahon LLC

(57)          ABSTRACT

A method for filamentation of a dielectric workpiece has a workpiece with a thickness between 0.5 and 20 mm is provided. The workpiece has boundary surfaces delimiting the workpiece. The thickness of the workpiece varies spatially and/or at least one of the boundary surfaces delimiting the workpiece has at least one curvature with a radius of curvature between 0.1 μm and 10 m. The dielectric workpiece can have a specially formed edge.

19 Claims, 7 Drawing Sheets

Related U.S. Application Data continuation of application No. PCT/EP2016/073692, filed on Oct. 4, 2016.

(51) Int. Cl.

| | |
|---|---|
| *B23K 26/046* | (2014.01) |
| *B23K 26/0622* | (2014.01) |
| *B23K 26/08* | (2014.01) |
| *B23K 26/351* | (2014.01) |
| *B23K 101/40* | (2006.01) |

(52) U.S. Cl.
CPC ...... *B23K 26/0624* (2015.10); *B23K 26/0884* (2013.01); *B23K 26/351* (2015.10); *B23K 2101/40* (2018.08)

(58) Field of Classification Search
USPC ..................................................... 219/212.67
See application file for complete search history.

(56) References Cited

U.S. PATENT DOCUMENTS

| | | | | |
|---|---|---|---|---|
| 7,638,731 | B2 * | 12/2009 | Kosmowski | ......... B23K 26/389 |
| | | | | 219/121.68 |
| 9,102,007 | B2 * | 8/2015 | Hosseini | .............. C03C 14/002 |
| 9,260,337 | B2 | 2/2016 | Abramov | |
| 9,615,222 | B2 | 4/2017 | Wen | |
| 9,624,121 | B2 | 4/2017 | Abramov | |
| 9,676,167 | B2 | 6/2017 | Marjanovic | |
| 9,850,159 | B2 | 12/2017 | Bhuyan | |
| 10,173,916 | B2 | 1/2019 | Bankaitis | |
| 10,233,112 | B2 | 3/2019 | Hackert | |
| 10,252,931 | B2 | 4/2019 | N'Gom | |
| 10,280,108 | B2 | 5/2019 | Bohme | |
| 10,335,902 | B2 | 7/2019 | Bookbinder | |
| 10,526,234 | B2 | 1/2020 | Genier | |
| 10,597,321 | B2 | 3/2020 | Marjanovic | |
| 10,611,667 | B2 | 4/2020 | Bookbinder | |
| 10,639,741 | B2 | 5/2020 | Russ | |
| 2002/0167581 | A1 | 11/2002 | Cordingley | |
| 2002/0190435 | A1 | 12/2002 | O'Brien | |
| 2007/0242279 | A1 | 10/2007 | Michelt | |
| 2010/0025387 | A1 * | 2/2010 | Arai | .................... B29C 65/1654 |
| | | | | 219/121.73 |
| 2011/0021004 | A1 | 1/2011 | Fukuyo | |
| 2011/0240617 | A1 | 10/2011 | Xu | |
| 2012/0135177 | A1 | 5/2012 | Cornejo | |
| 2013/0209731 | A1 | 8/2013 | Nattermann | |
| 2013/0280580 | A1 * | 10/2013 | Gaikwad | ............. H01M 50/136 |
| | | | | 156/60 |
| 2014/0027951 | A1 * | 1/2014 | Srinivas | ............... B23K 26/009 |
| | | | | 264/400 |
| 2014/0199519 | A1 | 7/2014 | Schillinger | |
| 2015/0034613 | A1 * | 2/2015 | Hosseini | ................ B23K 26/53 |
| | | | | 219/121.61 |
| 2015/0038131 | A1 * | 2/2015 | Wen | ...................... H04L 67/141 |
| | | | | 455/418 |
| 2015/0038313 | A1 | 2/2015 | Hosseini | |
| 2015/0151380 | A1 | 6/2015 | Hosseini | |
| 2016/0031745 | A1 | 2/2016 | Ortner | |
| 2016/0129526 | A1 | 5/2016 | Russ | |
| 2016/0280580 | A1 | 9/2016 | Boehme | |
| 2017/0008793 | A1 | 1/2017 | Bankaitis | |
| 2018/0062342 | A1 | 3/2018 | Comstock | |

FOREIGN PATENT DOCUMENTS

| | | |
|---|---|---|
| CN | 101291770 | 10/2008 |
| CN | 102880070 | 1/2013 |
| CN | 104688026 | 6/2015 |
| CN | 104690430 | 6/2015 |
| DE | 10325942 | 1/2005 |
| DE | 10317826 | 7/2005 |
| DE | 102006017400 | 1/2010 |
| DE | 102012110971 | 5/2014 |
| EP | 2044387 | 10/2012 |
| EP | 2781296 | 9/2014 |
| JP | H0271107 | 3/1990 |
| JP | 2938649 | 8/1999 |
| JP | 2007044411 | 2/2007 |
| WO | 2007047777 | 4/2007 |
| WO | 2008009472 | 1/2008 |
| WO | 2012006736 | 1/2012 |
| WO | 2012167999 | 12/2012 |
| WO | 2014111385 | 7/2014 |

OTHER PUBLICATIONS

Mayerhofer (Year: 2023).*

Mayerhofer, "Innovative Laserverfahren für das Schneiden, Bohren und Strukturieren von transparenten und sproden Materialien", Innovations-Manager, Rofin-Baasel Lasertech, Starnberg VDMA, Frankfurt, Germany, Mar. 4, 2014, 13 pages.

Rüttimann, "Sapphire Cutting with Pulsed Fiber Lasers: Thermal cutting as a cost-effective alternative to ultra-short pulse processing", Laser Technik Journal, Bd. 11, Nr. 3, Jun. 1, 2014, pp. 48-50.

English translation of the International Search Report dated Dec. 14, 2016 from corresponding International Application No. PCT/EP2016/073692, 3 pages.

English translation of the International Preliminary Report on Patentability dated Apr. 5, 2018 from corresponding International Application No. PCT/EP2016/073692, 11 pages.

* cited by examiner

METHOD AND APPARATUS FOR FILAMENTATION OF WORKPIECES NOT HAVING A PLAN-PARALLEL SHAPE, AND WORKPIECE PRODUCED BY FILAMENTATION

CROSS REFERENCE TO RELATED APPLICATIONS

This application is a divisional of prior application Ser. No. 15/945,992, filed Apr. 5, 2018 that is a continuation of International Application No. PCT/EP2016/073692 filed on Oct. 4, 2016, which claims benefit under 35 U.S.C. 119(a) of German Patent Application No. 10 2015 116 846.4 filed Oct. 5, 2015, the entire contents of which are incorporated herein by reference.

BACKGROUND

1. Field of the Invention

The invention relates to a method for filamentation, in particular for cutting a dielectric workpiece which has a shape deviating from a predefined nominal contour, and also relates to a dielectric workpiece having a specially formed edge.

Methods for separating dielectric workpieces, e.g. wafers, by subjecting them to laser radiation have been state of the art for many years. In recent years, the technique of filamentation has developed in which a workpiece is subjected to a laser which has a wavelength in the transparency range of the workpiece to be separated. The impact of the laser occurs in the form of pulsed ultrashort laser radiation, and the pulse may be in the form of an individual pulse or in a so-called burst mode, i.e. in the form of discrete packets. In this way, so-called filaments can be produced in dielectric workpieces such as glass, for example. A filament is known to be an elongated formation in the workpiece with a modified nature of the workpiece in the area of this formation. For example, microcracks and/or structural changes are caused in the area of the filament, e.g. in the form of crystallization or formation of new phases. The so formed defects in the workpiece are arranged along a predefined damage line and thus are effective as starting points for later separation of the workpiece along this line. Such a method is described in DE 10 2012 110 971 A1 by way of example.

Furthermore, international patent application WO 2014/111385 A1 discloses a method and a device for laser-based processing of sheet-like substrates. In this case, a substrate, e.g. a wafer or a glass element, is separated along a plurality of cutting lines, by producing a line focus in the workpiece so that induced absorption occurs, which induces crack formation in the substrate material. Here, the filament is in the form of a continuous formation from the starting point of filament formation to at least one surface of the workpiece, i.e. it is uninterrupted.

Furthermore, EP 2 781 296 A1 describes a two-step process in which filaments, i.e. damage zones, are first induced along a predefined course line, and in a further step a material removal and/or deformation step is performed, for example using a $CO_2$ laser, so that the workpiece can be separated along the course line.

International patent application WO 2012/006736 A2 describes a method for processing a transparent substrate for preparing a separation step. Here, filaments are produced inside the substrate by means of a laser, and it is also possible to form trench-like indentations in at least one surface of the substrate. Depending on the exact setting of the laser parameters, the filaments are formed inside the substrate due to self-focusing of the laser beam, and it is also possible to form a plurality of filaments in the substrate in a row. In a further step, the substrate is separated along the so produced defect line.

However, the methods mentioned above reach their limits when workpieces are to be separated that do not have a plane or flat shape, e.g. the shape of a slice or sheet or of a ribbon which is delimited by plane-parallel surfaces subject to manufacturing tolerances within a typical range.

For example, the problem of warped sheets, such as glass sheets, has been known for a long time. Moreover, such sheets often exhibit a certain waviness or, more generally, a thickness variation along their extension, so that they generally deviate from a flat shape. Since the positioning of the filaments relative to the surfaces is decisive for a good reproducibility of the induced damages in order to provide for separation with a minimum of errors and rejects, an increased number of rejects is caused with workpieces that are not optimally shaped. Furthermore, with the previously known methods it is not possible at all to achieve filamentation and separation of workpieces that have a shape deviating more strongly from the flat, planar shape or which have a particularly large thickness.

SUMMARY

There is thus a need for a method for filamenting and separating workpieces that have a shape deviating from the flat shape, e.g. a wedge-like shape, and/or a large thickness, or distinguished by boundary surfaces having curvatures, for example.

An object of the invention is to provide a method which permits to separate a workpiece having a large thickness and a shape deviating from the flat shape, and to provide a workpiece produced in this way, in particular with an edge formed according to this method.

The method according to the invention for filamenting a dielectric workpiece which preferably has a thickness between 0.5 and 20 mm, this thickness varies spatially and/or at least one of the boundary surfaces (11) and (12) delimiting the workpiece has at least one curvature with a radius of curvature between 0.1 μm and 10 m, comprises the following steps.

First, a dielectric workpiece is provided. The dielectric workpiece of the present invention may be, e.g., a wafer or a glass element having a spatial shape that deviates from the sheet-like or ribbon-like shape. The workpiece of the present invention may have a wedge-like shape, for example. However, it is also possible that the workpiece is in the form of a warped sheet or exhibits so-called waviness. More generally, it is therefore possible that the deviations from sheet-like or ribbon-like shape are relatively small. However, it is also possible that the workpiece is in the form of a three-dimensionally shaped body, for example as a hollow body in the form of an ampoule or a tube.

The second step comprises the predefining of the course line of the filament containing zone which is also referred to as filament zone, in the workpiece, and hence the predefining of which is to become the edge of the workpiece.

Subsequently, in the third step, a laser processing device is provided, wherein the laser is configured as a short pulse or ultrashort pulse laser and emits a laser radiation of a wavelength in the transparency range of the workpiece.

Furthermore, the laser processing device comprises beam shaping means for beam shaping, in particular for focusing the laser radiation.

In the fourth step, a device is provided for determining the thickness of the workpiece and/or for determining the surface contour(s) thereof and/or for determining scattering centers in the workpiece. Preferably, this device can also serve to control the spacing between the laser processing head and the surface of the workpiece facing the laser processing head.

The fifth step comprises the determining of the surface contour, and/or the thickness of the workpiece, and/or scattering centers in the workpiece by optical measurement, e.g. by confocal measurement.

In the sixth step, the workpiece is subjected to laser radiation in the form of a laser pulse or in the form of bursts such that the laser pulse produces a filament in the workpiece.

In the context of the present invention, a filament is produced as a laser radiation induced formation which has only a very small diameter in a range of a few micrometers, but a length in the millimeter range.

This formation is distinguished by the fact that the initial nature of the workpiece is altered in this area.

For example, new phases may be formed which have an increased density compared to the original workpiece. (Re) crystallization is also possible, at least in portions of the filament. Furthermore, cracks are typically formed in the area of the filament, in particular microcracks. Thus, the filament generally constitutes a formation in the workpiece that implies a weakening thereof, so that separation of the workpiece can be achieved along the course line of the filaments. Preferably, the filaments are formed as cavities.

Finally, the seventh step comprises moving the laser radiation relative to the workpiece in accordance with the course of the course line defined in the second step.

Furthermore, the sixth and seventh steps are repeated, so that filaments with defined starting and end points are produced in the filament zone, preferably cavities.

In the method according to the invention, the spatial position of the starting point of the filament in the workpiece is preferably defined relative to the surfaces delimiting the workpiece on the basis of the determination of the surface contour and/or of the thickness of the workpiece performed in the fifth step, and/or may as well preferably be defined after determining scattering centers in the workpiece inside the workpiece relative to the determined scattering centers.

Preferably, the local curvature or a local tangent at the point of incidence of the laser beam is calculated, and, based thereon, the direction of the surface normal vector is determined.

By determining a difference between the original, i.e. uncorrected laser beam direction and the direction of the surface normal at a profile point of the surface, which is calculated from the profile data of the respective profile point and optionally of adjacent profile points, the correction angles are obtained for three-dimensionally shaped bodies, i.e. bodies in which the surfaces delimiting these bodies are not plane-parallel, in order to provide for a vertical impact, i.e. vertical incidence of the laser beam at any desired position on the surface. Here, a profile point is understood to be a point that is located on one of the surfaces of the workpiece.

For example, according to the method the position of the starting point can be defined such that it is set relative to a surface of the workpiece.

This is possible, for example, if in the fifth step the surface contour of the workpiece is determined, in particular for a multitude of profile points of the surface, and subsequently the starting points of the filaments are each defined at a certain distance to one of the surfaces of the workpiece in dependence of the profile of the surface contour.

For example, after determining the surface contour of the workpiece, it is possible to arrange all the filament starting points in the workpiece at a distance of 0.5 mm from the surface of the workpiece facing away from the laser processing device (i.e. its lower face).

However, it is also possible to assign individual starting values to each of the filament starting points, i.e. to arrange filament 1 at a distance of 0.2 mm from the lower face of the workpiece, filament 2 at a distance of 0.5 mm, and filament 3 at a distance of 1 mm, for example.

It is possible that the thickness of the workpiece is chosen such that it cannot be completely penetrated by a single filament alone over its entire thickness. In such a case, a plurality of filaments are advantageously produced one above the other. In such a case, it has also proved to be particularly advantageous if the starting point of a new filament is also the end point of the last produced filament. In such a case, the starting point of the filament is preferably determined on the basis of determining scattering centers in the workpiece.

By producing a filament in a workpiece, a material transformation is caused in the material in the form of an internal defect which can be optically determined from changed scattering behavior of the material at this point.

In this way, it is possible particularly advantageously to produce a long continuous filament which is composed of different partial filaments. The starting point of the lowermost filament as seen from the upper face which is the surface of the workpiece facing the laser processing device, i.e. of the filament that is produced first, may be located in the workpiece due to the determining of the surface contour and/or of the thickness of the workpiece and/or the determining of a scattering center.

The starting points of the subsequent partial filaments are determined in each of the following processing steps by determining the scattering center, which is formed by the end point of the respective previously produced partial filament. Thus, a long continuous filament is produced, in which the starting points of the partial filaments are defined by the end points of previously formed partial filaments in each case.

In this way, it is also possible to produce a plurality of filaments one above the other, which are not formed continuously but with a certain spacing, e.g. between the end point of the first produced filament and the starting point of the subsequently produced filament, which spacing is defined by the processer.

Particularly suitable lasers are so-called short pulse lasers. For producing long filaments, it is particularly advantageous to operate such an ultrashort pulse laser in the so-called burst mode. In this case, the laser pulse is not emitted as a single pulse but consists of a plurality of pulses emitted in quick succession, the so-called bursts.

A suitable laser source according to the present invention is a neodymium-doped yttrium-aluminum-garnet laser having a wavelength of 1064 nanometers (nm). The laser source operates in particular at a repetition rate between 10 kHz and 120 kHz, preferably between 30 kHz and 110 kHz, and most preferably between 35 kHz and 105 kHz. The scanning rate may preferably be chosen such that, depending on the repetition rate, the spacing between adjacent filamentary defects is in a range from 4 micrometers to 10 micrometers.

In this case, the suitable pulse duration of a laser pulse is in a range of less than 100 picoseconds, preferably less than 10 picoseconds. The pulse duration may even be less than 1 picosecond. The typical output power of the laser source, also referred to as laser below, is particularly advantageously in a range from 40 to 100 watts. According to an advantageous further embodiment of the invention, a pulse energy of more than 200 microjoules is applied in a burst, and furthermore advantageously a total burst energy of more than 500 microjoules, in order to achieve the filamentary damages.

In case the ultrashort pulse laser is operated in the burst mode, the repetition rate is the rate of repeated burst emission. The pulse duration is essentially independent of whether a laser is operated in the single-pulse mode or in the burst mode. The pulses within a burst typically have a similar pulse length as a pulse in the single-pulse mode.

Furthermore, it is possible to obtain high-energy ultrashort pulses in different wavelength ranges, such as the infrared (1064 nm), VIS (532 nm), or UV (355 nm), by doubling or tripling the frequency, so that one of the substantial conditions for filamenting and thus the filamentation, namely to provide a medium that is transparent to the employed laser radiation, are fulfilled not only for a medium that is transparent in the optical range of the spectrum, such as glass, but also for a medium that is transparent in the infrared, such as silicon. The process of multi-step filamentation is therefore also applicable as a preparation for separating silicon wafers.

For example, the surface contour of the workpiece may be determined in the form of a traversing measurement, i.e. a measurement in which the measuring head is moved over the surface of the workpiece, for example in parallel to two orthogonal spatial directions.

In this case, the position of the two surfaces of the workpiece is determined with respect to a predefined reference point for the focusing optics by measuring the maximum scattering intensity prevailing at each measuring point.

With such a method, the real shape of the surfaces of the brittle material can be determined in the form of point clouds. The real local curvatures of the surface can be described by interpolations of the workpiece surfaces with subsequent differentiation. The variation of the spacing between the measuring head and the workpiece surface(s) represent shape deviations from the ideal shape of a flat workpiece having aligned plan-parallel surfaces, and are detected by this method.

Local curvatures of the surface can also be determined from the determined profile data by differentiation, so that a model of the workpiece surfaces can be obtained. The procedure for confocal distance measurement is described in DE 10325942 B4, DE 10317826 B4, and DE 10 2006 017 400 B4, by way of example. A description of industrial applications of the confocal sensor technology in glass production can be found in EP 2 044 387 B1.

However, besides confocal distance measurement, other methods for contour detection can also be used as an alternative, such as laser triangulation, light-section technology, or two-dimensional interferometric techniques on glass.

For the process of filamentation or filamenting, a computer-assisted surface model of the workpiece surface is used comprising a multitude of profile points, and the position of the focal point is varied via suitable focusing optics, e.g. a motor-driven telescope or a motor-driven focusing lens, and thus the starting point of the filamentation in the direction of the glass thickness or the position of the produced filament structure in the direction of the glass thickness is adjusted. In the case of local curvatures of the workpiece surface, the angle of incidence of the laser beam onto the workpiece can be corrected by suitable measures in the focusing beam path.

For a given material as well as laser and optical parameters, the form of the filament structure is reproducibly defined, so that not only the position of the starting point of the filament can be adjusted in a defined manner but also its position in the direction of the glass thickness. In particular, the distances of the end points of the filament structure are adjustable.

If the thickness of the workpiece is so large that it is not possible to produce a single filament of sufficient length for the subsequent separation of the workpiece in a single laser-treatment step, filaments are produced in different height sections of the workpiece according to an embodiment of the invention. In this case, these filaments produced one above each other are exactly aligned one above the other in the direction of the incident laser radiation, i.e. their spatial position only differs in terms of their level in the workpiece but not in the lateral direction.

In a further embodiment of the invention, the filaments that are closer to the surface of the workpiece facing away from the device generating the laser radiation are produced first. Here, the procedure from "bottom" to "top" in the workpiece is necessary in order to ensure on the one hand the ability of the laser beam to focus and on the other hand the detectability of the internal damage. In fact, an already produced filament, i.e. an internal damage in the form of a material transformation affects the ability of the laser beam to focus "behind" the filament, i.e. on the side facing away from the laser. Also, the optical measuring instrument can only detect the start of the filament, but is often not capable of detecting further scattering centers through the filament.

Preferably, the starting point of the first produced filament is the end point of the later produced element, so that a preferably continuous long filament is obtained as a result.

In a preferred embodiment of the invention, the filaments are formed so as to extend across the entire thickness of the workpiece.

In a further embodiment of the invention, the filaments are formed as tubular cavities. In this case, the cavities are distinguished by the fact that their length is greater than their diameter, wherein the areas of the dielectric material surrounding the filaments have at least partially a greater density than the areas which are located outside the filament zone.

In a further embodiment of the invention, a non-linear optical interaction of the laser radiation with the workpiece occurs such that a complete plasma formation and/or a plasma explosion occurs in the workpiece, such that the workpiece includes a cavity after the plasma formation occurred.

In one embodiment of the invention, the focusing or beam shaping means are adjusted such that the laser radiation is focused in the form of a line focus during the laser pulse, wherein the line focus is distinguished by a channel of high light intensity which has a length of 10 mm or less and a diameter of 10 μm or less.

According to a further embodiment of the invention, the beam shaping or focusing means comprise a converging lens preferably with increased spherical aberration, and/or an axicon, and/or a diffraction grating consisting of circular concentric lines, and/or a diffractive optical element, and/or a computer-generated hologram.

According to yet another embodiment of the invention, the laser beam can be guided by a robot using optical fibers and/or mirror combinations such that it is directed onto the surface facing the laser radiation at an angle between 75° and 105°, preferably at an angle of 90° and thus in the direction of the surface normal, taking into account the surface contour of the workpiece as determined in the fifth step. Here, the term surface normal vector is used synonymously with the term normal vector of the surface or direction of the surface normal. In particular with respect to the laser radiation, the term direction of surface normal denotes a direction into the workpiece, i.e. in the light propagation direction of the beam path of the laser processing device.

In a further embodiment of the invention, after determining the surface contour of the workpiece, a surface model thereof is created, which preferably comprises a multitude of profile points.

In a further embodiment of the invention, a computer-assisted control of the filament starting points is achieved on the basis of this model along the separation line in the workpiece, which corresponds to the defined course line of the filament zone in the workpiece.

Once the method according to the invention for filamenting a dielectric workpiece has been performed, the workpiece is partitioned into different portions by the separation or course line defined by filaments. Thus, the workpiece is not separated but only weakened at the separation lines defined by the filaments.

According to a further embodiment of the invention, it is possible in this case that minor cracks arise between the individual filaments or are deliberately caused by a subsequent separation or cleaving step, for example.

In this cleaving step, induced thermomechanical stresses lead to a crack along the pre-damaged line extending along the separation or course line. This may be achieved by irradiation with an infrared laser, such as a $CO_2$ laser (with or without subsequent cooling), for example.

If the separation line was designed as a rectilinear or curved line, the workpiece can now be separated. If, however, the pre-damaged line defined by the filaments forms a closed loop, a further step of detachment is then performed according to a further embodiment of the invention.

Such detachment can be achieved by introducing stresses into the workpiece, for example. The introducing of stresses is preferably effected by selective heating such that only a portion defined by a pre-damaged line is heated but another remains at a lower temperature, so that a mechanical stress is generated between these portions such that a detachment occurs along the separation line.

The dielectric workpiece of the present invention is preferably made of glass or glass ceramic. In the context of present description and for the meaning of the appended claims, the term glass is used as a generic term for glass as well as for glass ceramics, since glass ceramics also contain glass. Preferably, the glass is an aluminosilicate or borosilicate glass.

With the method according to the invention, a dielectric workpiece is obtained which preferably has a thickness between at least 0.5 mm and at most 20 mm and wherein this thickness furthermore varies spatially and/or at least one of the boundary surfaces delimiting the workpiece has at least one curvature with a radius of curvature between 0.1 μm and 10 m, and furthermore at least one edge of the workpiece has a roughness RMS from 1 to 5 μm, wherein this roughness is determined by a roughness measurement using an atomic force microscope and/or a white light interferometer, and wherein the material of the workpiece in this area differs at least partially from the remaining portion of the workpiece in terms of its properties, for example in terms of phase content, refractive index, and/or density.

An apparatus, in particular for carrying out the disclosed method for filamenting a dielectric workpiece and preferably for producing a dielectric workpiece, preferably comprises a light source, in particular a laser light source; a device for providing a workpiece; a device for relative movement of the beam path of the light source relative to the workpiece; means for controlling the relative movement of the beam path of the light source relative to the workpiece; means for determining the surface contour, and/or the thickness of the workpiece, and/or of scattering centers in the workpiece, preferably by optical measurement.

Most preferably, the device for providing a workpiece comprises a tiltable table which is configured to be translatable preferably in three orthogonal spatial directions and pivotable preferably around two orthogonal spatial directions. If the tiltable table is configured to be pivotable around a fixed point in space, preferably around a profile point of the workpiece provided on the tiltable table, it is possible to align the direction of the beam path of the light source, in particular of the main ray of the laser light source in the direction of the surface normal vector by pivoting the tiltable table.

In a preferred embodiment, the means for determining the surface contour, and/or the thickness of the workpiece, and/or scattering centers in the workpiece preferably comprising a measuring head that is translatable relative to the workpiece preferably in two orthogonal spatial directions comprises a polychromatic light source, and a highly dispersive optical element which focuses the light, wherein different wavelengths are focused with different focal lengths, and comprises a spectrometer capable of spectrally analyzing back-reflected light, in particular light back-reflected from the workpiece 1.

Preferably, a device for relative movement of the beam path of the light source relative to the workpiece includes a robotic arm and translators for translating the tiltable table in three orthogonal spatial directions and pivoting the tiltable table around two orthogonal spatial directions.

The invention will now be described in more detail by way of preferred embodiments and with reference to the accompanying drawings, which are not illustrated to scale for the sake of clarity and for better understanding.

DETAILED DESCRIPTION

Figures 1, 2:
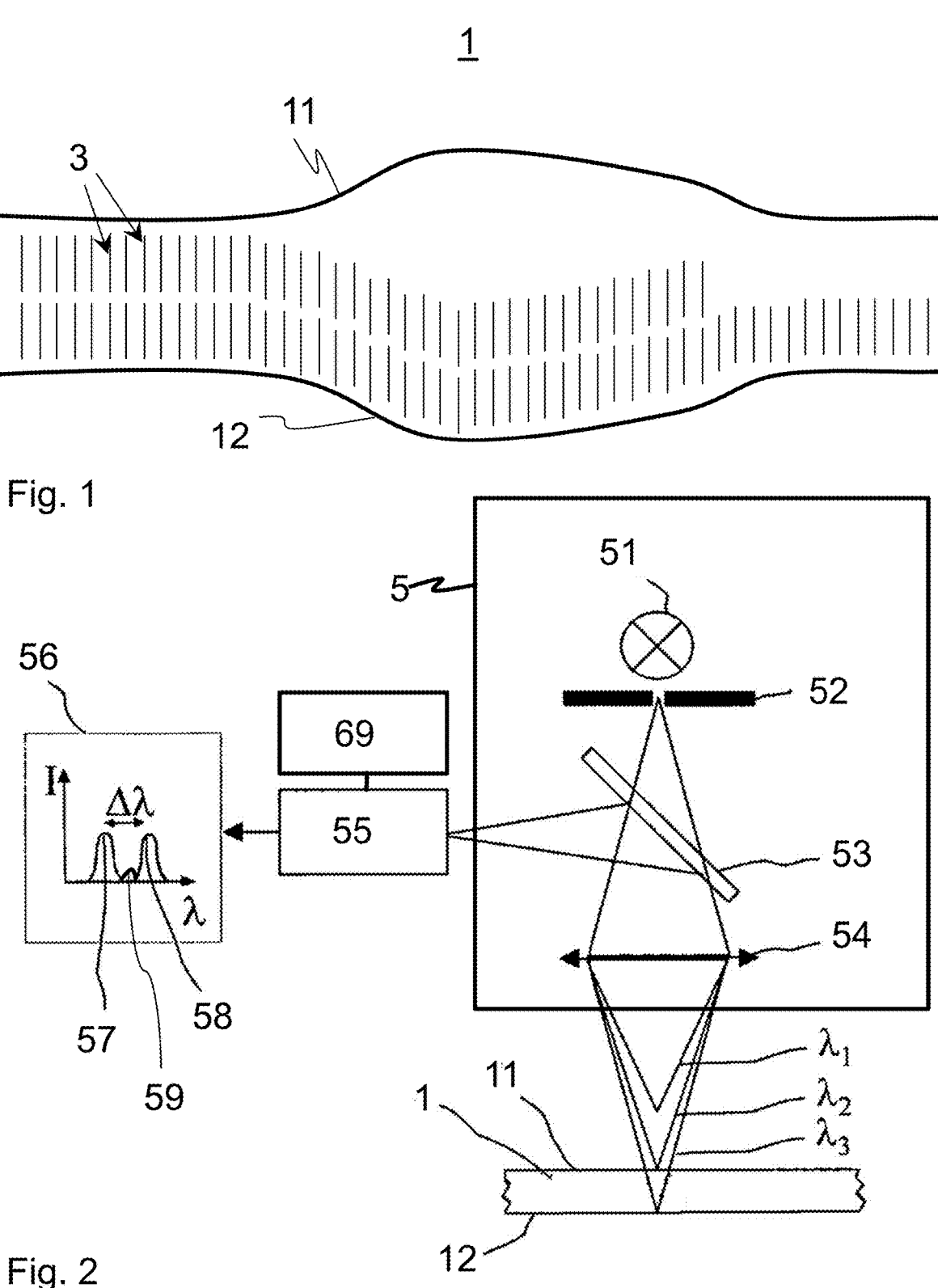
FIG. 1 is a schematic sectional view through a workpiece with filaments in different heights of the workpiece.
FIG. 2 schematically illustrates the confocal measuring principle for determining the surface contour of a workpiece not having plane-parallel surfaces.

In the following description of preferred embodiments, the same or equivalent elements and features are indicated by respective identical reference numerals.

FIG. 1 is a schematic sectional view through a dielectric workpiece 1 not drawn to scale. Workpiece 1 deviates from an ideal planar shape by the fact that the two delimiting surfaces 11 and 12 are not formed ideally parallel to each other. Rather, the thickness of workpiece 1 has an irregular gradient.

Furthermore, the figure shows different filaments 3, which are not all provided with individual reference numerals, for the sake of clarity.

The thickness of workpiece 1 which is delimited by surfaces 11 and 12 that are not plane-parallel to each other therefore varies along the extension of workpiece 1. Furthermore, surfaces 11 and 12 exhibit curvatures. The workpiece of the present invention is generally formed such that the lateral extension of the surfaces delimiting it is greater by at least one order of magnitude than its thickness.

More generally, without being limited to the illustrated example, workpiece 1 may be formed such that it is characterized by at least one of the following features. Surfaces 11 and 12 of workpiece 1 are not formed plane-parallel to each other, rather the thickness of the workpiece varies over the lateral extension thereof. For example, workpiece 1 may be in the form of a slice in which a structure has been deliberately introduced on a surface, e.g. surface 1, in order to optimize reflection properties of the workpiece 1, for example a pyramidal structure. Furthermore, workpiece 1 may also be in the form of a simple wedge, or at least one of the surfaces 11 and 12 has a curvature, wherein the curvature is characterized by a radius in a range from 0.1 μm to 10 m. Thus, the deviation of workpiece 1 from an ideal slice-like shape may be a very small deviation such as in the case of warp or waviness of a slice.

The thickness of workpiece 1 is in a range from at least 0.5 mm to a maximum of 20 mm. In the case of such thicknesses it is usually not possible with only a single filament 3 to introduce a sufficient pre-damage into the workpiece across the thickness thereof, which is sufficient for later neat separation. Rather, in the case of such thick workpieces, a plurality of filaments 3 must be produced successively in different height zones of the workpiece.

In the present example, a lower series of filaments 3 was produced first, which is located closer to the surface 12 of workpiece 1 facing away from the laser. In a second step, further filaments 3 are then produced in a higher zone of workpiece 1, and preferably these filaments 3 are spatially located exactly above the filaments 3 that were produced first.

FIG. 2 schematically illustrates the confocal measuring principle for determining the surface contour of a workpiece 1 which has surfaces 11, 12 that are not formed plane-parallel, although the deviation from planarity is only very slight in the workpiece 1 shown here. This measuring principle is also described in international patent application WO 2008/009472 A1, for example, and is explained as follows:

The measuring head 5 of the device for determining the surface contour, and/or the thickness of workpiece 1, and/or scattering centers in workpiece 1 comprises a polychromatic light source 51, which may be a halogen lamp or a diode, for example. For a preferably punctiform focus of the light, the light of light source 51 first passes through an aperture 52 and is subsequently incident on a highly dispersive optical element 54 which focuses the light, wherein different wavelengths are focused with different focal lengths.

By way of example, the light cones for light of the three different wavelengths $\lambda_1$, $\lambda_2$, $\lambda_3$ are illustrated. Here, the light of wavelength $\lambda_1$ is already focused in front of workpiece 1. The focus of the light of wavelength $\lambda_2$ is on the surface 11 of the workpiece facing the measuring head and the laser; the focus of the light of wavelength $\lambda_3$ is on the surface 12 of workpiece 1. The light of wavelengths $\lambda_2$, $\lambda_3$ is partially reflected on surfaces 11 and 12 back into the optical element 54 and, via a semi-transparent mirror 53, is focused onto the entrance aperture of a spectrometer 55 and is analyzed in the spectrometer. By contrast, light having wavelengths between $\lambda_2$ and $\lambda_3$ is only slightly reflected back into the optical element. An exemplary spectrum 56 shows the two peaks 57 and 58 corresponding to the two wavelengths $\lambda_2$ and $\lambda_3$.

The distance $\Delta\lambda$ between these two peaks is a measure of the thickness of the workpiece and serves to measure the thickness of the workpiece. The spectral distance $\Delta\lambda$ can be converted into a thickness d of the workpiece, by normalization. Furthermore, a table may be stored in a computer 69 connected to measuring head 5, which stores the respective thickness values for each of the different values of the spectral distance $\Delta\lambda$. Such a table can be advantageous if workpieces are used that have different refractive indices. In such a case, an individual table can be stored in computer 69 for the material of each respective workpiece.

Figure 9:
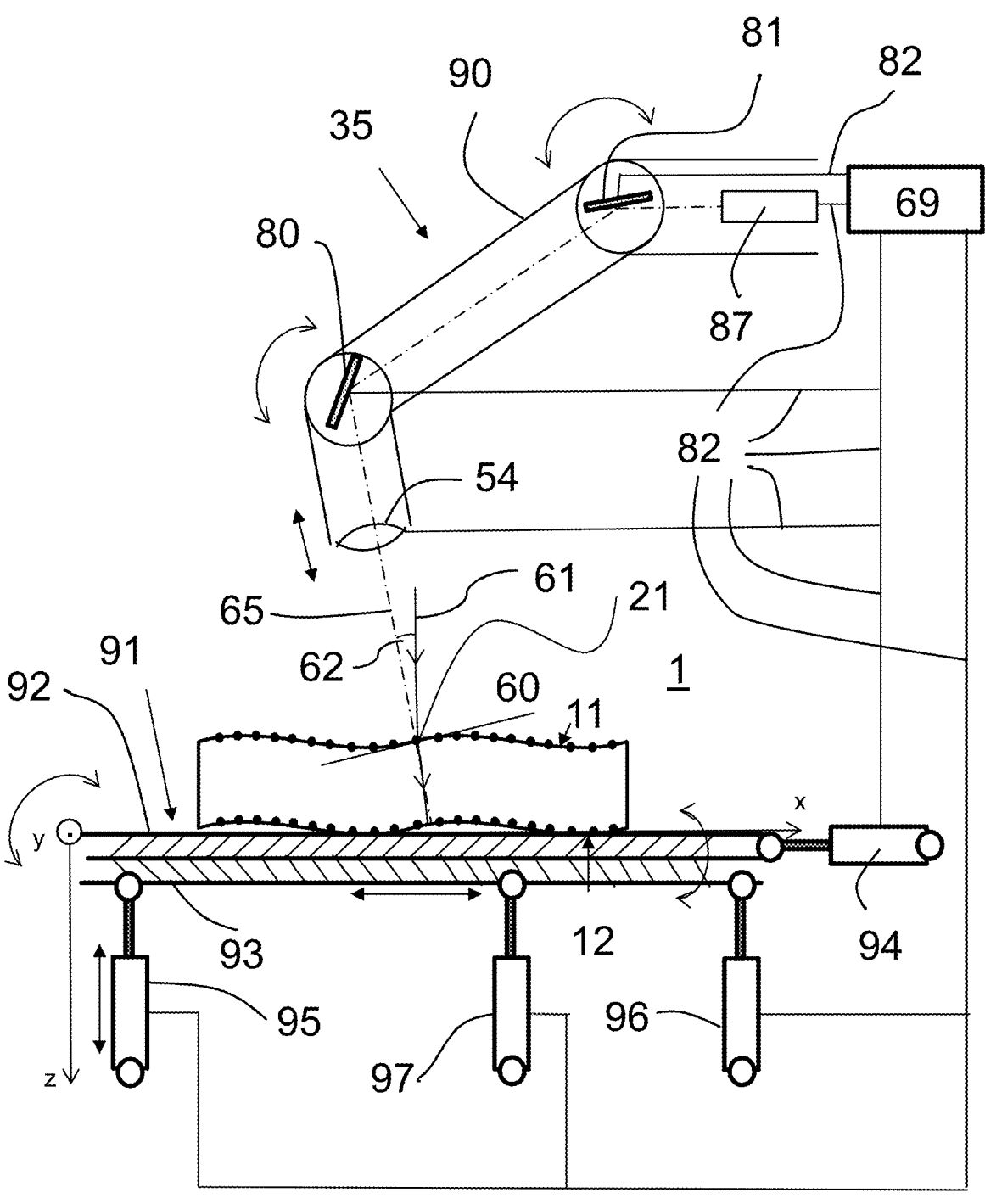
FIG. 9 schematically illustrates the generation of filaments in different depths of a workpiece not having ideal plane-parallel surfaces, using a robotic arm that includes movable mirrors arranged therein and a tiltable table laterally movable in the x- and y-directions and configured to be pivotable around the x and y-directions.
Figure 10:
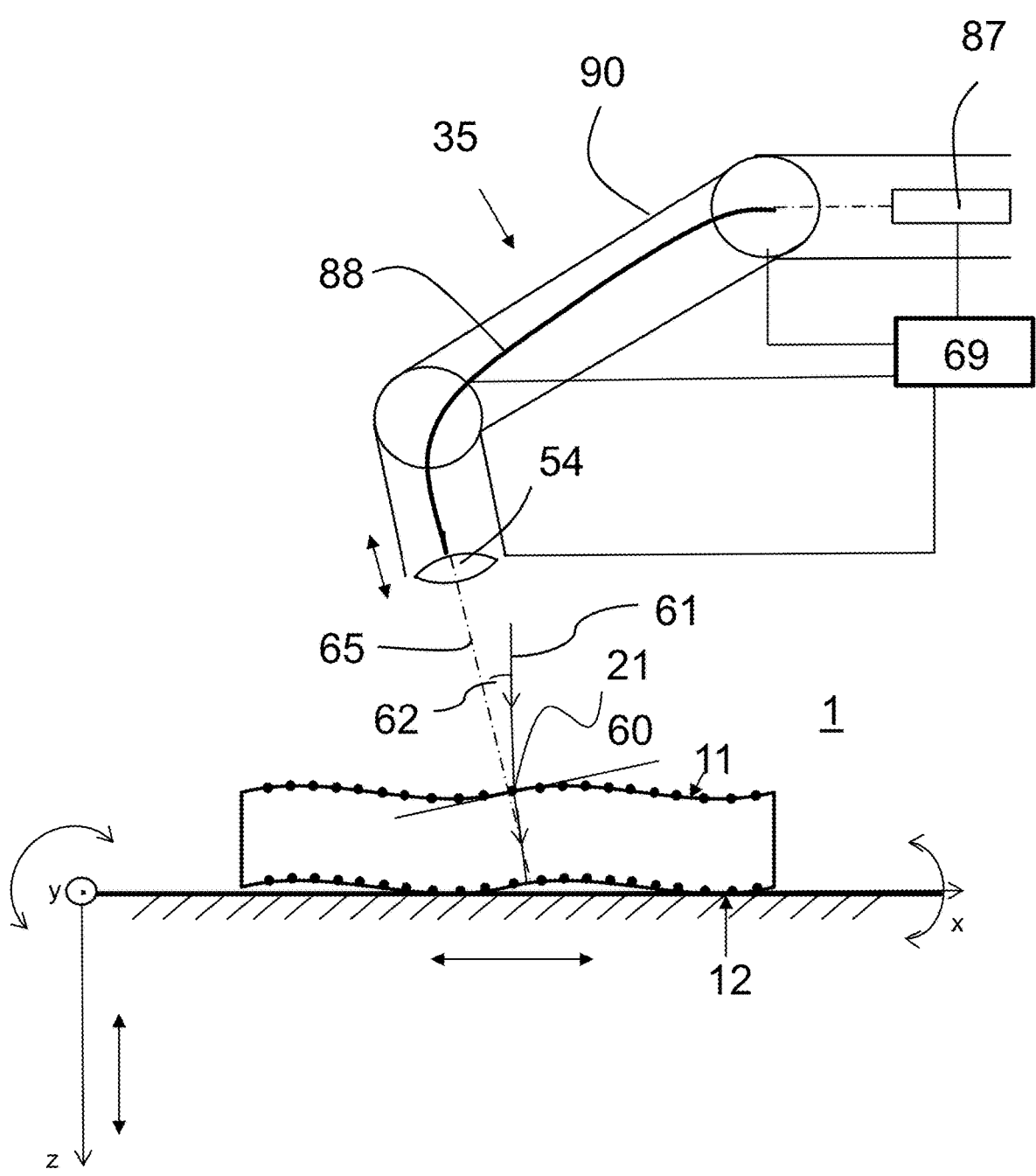
FIG. 10 schematically illustrates the generation of filaments in different depths of a workpiece not having ideal plane-parallel surfaces, using a robotic arm that includes a light guide arranged therein.
Figure 11:
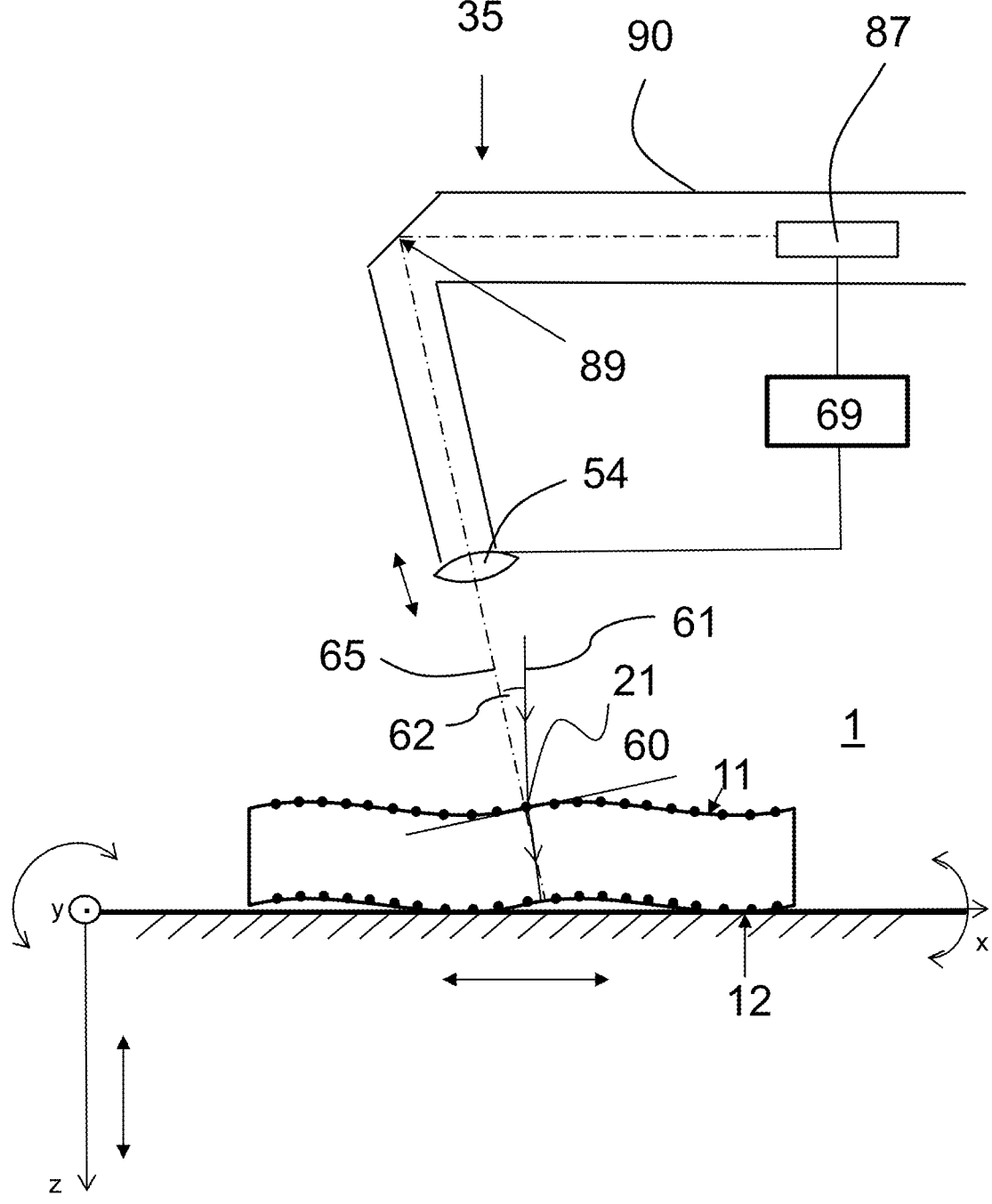
FIG. 11 schematically illustrates the generation of filaments in different depths of a workpiece not having ideal plane-parallel surfaces, using a robotic arm that includes inner mirrored walls for guiding light.

These means described in the preceding paragraphs thus constitute an optical measuring system for means for determining the surface contour, and/or the thickness of workpiece 1, and/or scattering centers in workpiece 1 and comprises a measuring head 5 that is translatable relative to the workpiece preferably in two orthogonal spatial directions, wherein these orthogonal spatial directions extend in the direction of the x- and y-directions as shown in FIGS. 9, 10, and 11, for example.

Here, the measuring head 5 comprises the polychromatic light source 51 and the highly dispersive optical element 54 which focuses the light, wherein different wavelengths are focused with different focal lengths, and comprises the spectrometer 56 capable of spectrally analyzing back-scattered and/or reflected light, preferably light that is scattered and/or reflected back from workpiece 1.

If the reference surface 34 on which the workpiece 1 is provided (see FIGS. 5 and 6 for example) is located in the measuring area of measuring head 5 which is also referred to as a confocal sensor of the optical measuring system, with the curved surface 12 of workpiece 1 thereon, three peaks will occur depending on the material property of reference surface 34, and the warp of workpiece 1 can be determined as a maximum height difference between the points on the surface 12 of workpiece 1, or else to the profile points 21 on the surface 11 of the workpiece and on the reference surface 34. Depending on thickness variations of the workpiece 1, it is even possible that different values of local warp are obtained for surface 11 and surface 12.

Figure 3:
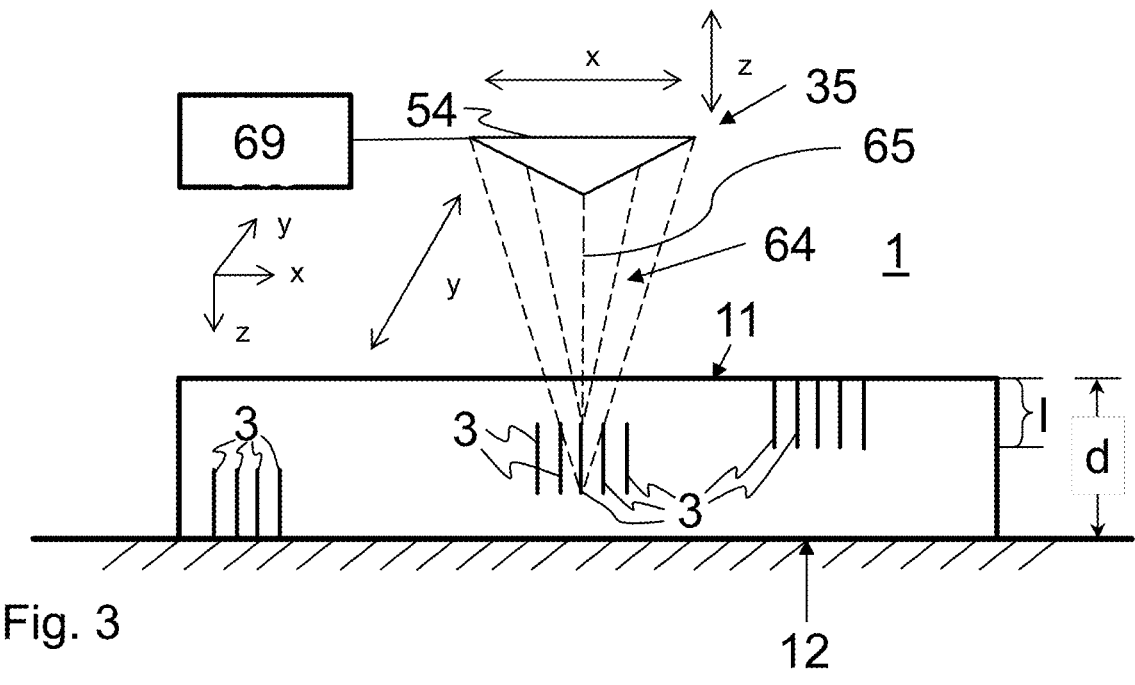
FIG. 3 schematically illustrates the generation of filaments in different depths of a workpiece that has ideal plane-parallel surfaces.

FIG. 3 schematically illustrates an ideal dielectric workpiece 1, i.e. a dielectric workpiece 1 with the two surfaces 11 and 12 being plane-parallel to each other.

Here, the laser processing device 35 is only represented schematically by a highly dispersive optical element 54, for example an axicon or a converging lens with spherical aberration, and by a beam path 64 of this laser processing device 35 illustrated as a chain dotted line.

On the left side of FIG. 3, the letters x, y, and z next to respective arrows represent the three orthogonal spatial directions which span a Cartesian coordinate system and to which reference will be made in the description of the following figures. In the case of an ideal plane-parallel workpiece 1, spatial direction z extends perpendicular to the two surfaces 11, 12, and spatial directions x and y extend in parallel to these surfaces 11, 12.

In FIG. 3 and in the further figures, spatial direction y extends "backwards" from the viewer's viewpoint, i.e. into the view of FIG. 3.

Laser processing device 35 which is shown only schematically in FIG. 3, and hence the highly dispersive optical element 54 can be translated by motors in the directions of the double arrows indicated by letters x, y, and z, and thus in the three orthogonal spatial directions x, y, and z, as will be described in more detail below with reference to FIG. 9.

In case of a workpiece 1 of a thickness d, laser processing device 34 is able to readily generate filaments 3 of a length 1 at different depths of the workpiece 1, preferably in computer-assisted manner.

For the sake of clarity, filaments 3 have not all been provided with an own reference numeral.

Figure 4:
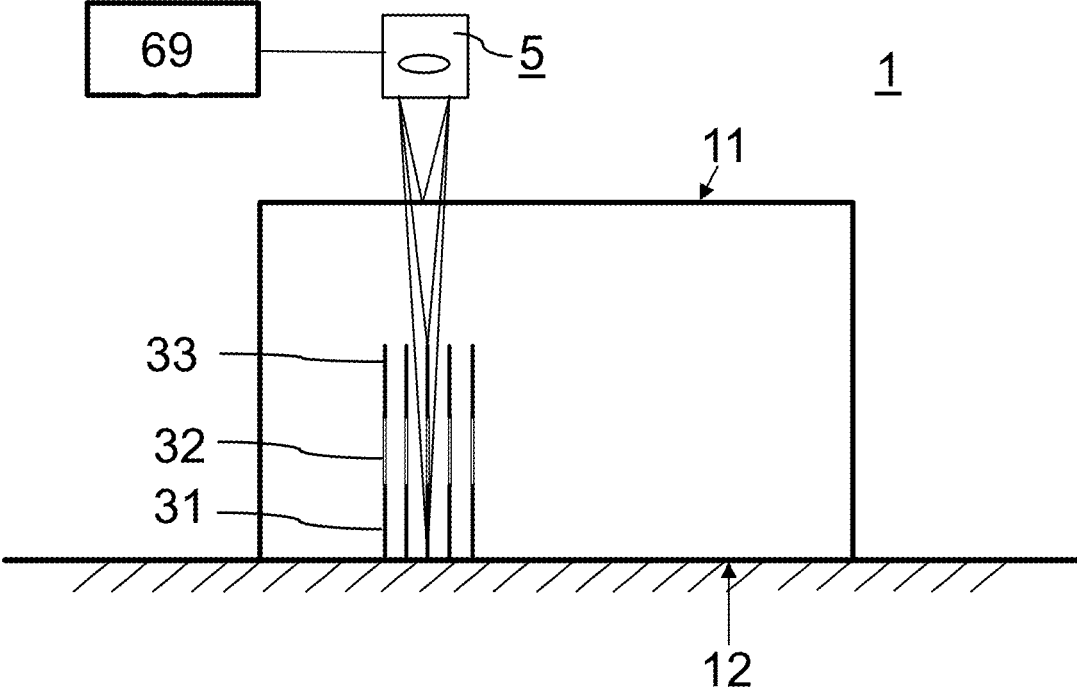
FIG. 4 schematically illustrates the determination of the surfaces delimiting the workpiece and of the position of scattering centers in the workpiece by optical measurement.

FIG. 4 illustrates the optical measuring system with measuring head 5 comprising the confocal measuring system described above, by means of which the surfaces 11, 12 of workpiece 1 can be determined in their relative position to each other, preferably for a multitude of profile points 21 located on surface 11, which will be described in more detail with reference to FIGS. 5 and 6.

This optical measuring system comprising measuring head 5 can be used to determine the position of scattering centers which arise within workpiece 1, for example at the end points of a filament 3. Such scattering centers occur as an often lower peak 59 in the image of spectrum 56 between the two peaks 57 and 58 corresponding to the two wavelengths $\lambda_2$ and $\lambda_3$, and the position thereof in the image of spectrum 56 indicates the depth of the scattering center, in particular the depth beneath a profile point 21 of surface 11.

In this way it is also possible, for example, to produce filaments at different depths in a defined manner, i.e. to produce filaments 31 which extend from surface 12 into the workpiece 1, and to produce filaments 32 linked consecutively thereto, and filaments 33 linked consecutively to the latter, for example.

Without being limited to the example of an optical determination of the surface contour or thickness illustrated here, it is generally also possible to use a method other than an optical measuring method.

For example, the determination of the surface contour can also be achieved by scanning the surface 11 using a mechanical scanning method. The thickness or the surface contour can also be determined by a capacitive measurement or by scanning using an atomic force microscope.

As a further optical measuring method, it is also possible to use an interferometric measurement, e.g. also in the form of optical coherence tomography (OCT), which is known per se to the person skilled in the art.

Figure 5:
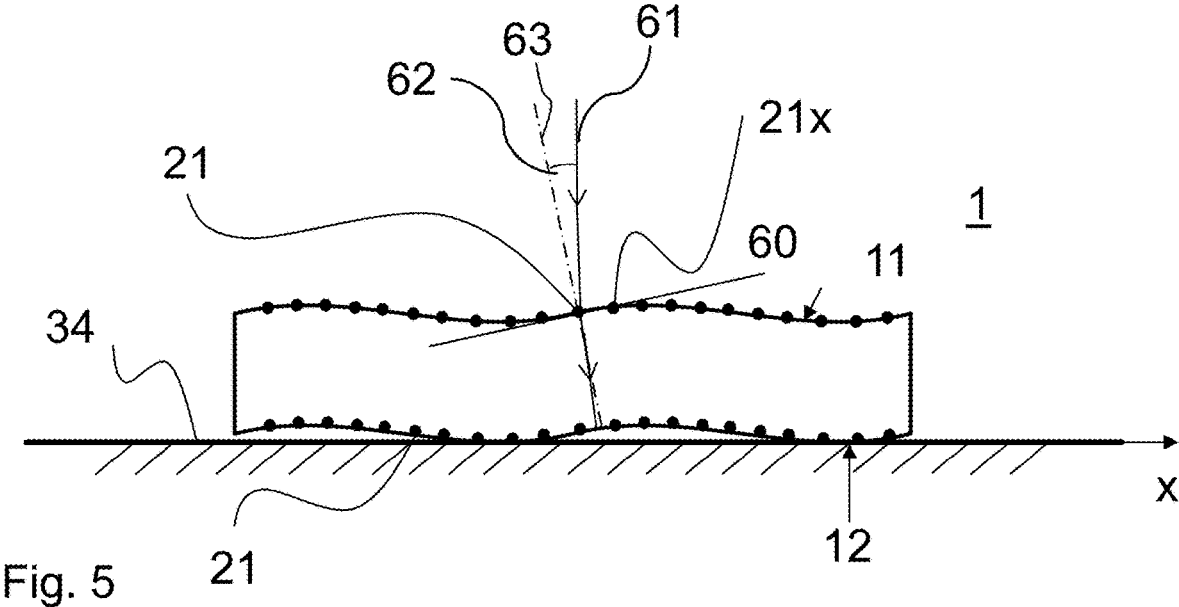
FIGS. 5 and 6 schematically illustrate a workpiece each not having plane-parallel surfaces, and the determination of the surface normal vector.

FIG. 5 schematically shows a workpiece 1 which has surfaces 11, 12 that are not plane-parallel to each other.

The confocal measuring system comprising measuring head 5 detects the position of a multitude of profile points 21 on surface 11, and for the sake of clarity not all profile points 21 have been provided with an own reference numeral.

Once the position of a multitude of profile points 21 on surface 11 has been determined, an image of the surface contour of surface 11 is obtained in computer 69. Then, the local curvature of surface 11 at the point of incidence of the laser beam, e.g. at the location of profile point 21, can be calculated by the computer 69, for example, from these profile data by differentiation or determination of a local tangent.

Accordingly, the direction of surface normal vector 63 is determined, which is illustrated in FIG. 5 for a tangent 60 that passes through profile point 21 and profile point 21x offset relative thereto in the x-direction. This tangent 60 can be used to determine the correction angle 62 in the x-direction by determining the inclination thereof relative to the x-direction. This inclination of tangent 60 relative to the x-direction at the location of profile point 21 corresponds to the inclination of normal vector 63 in x-direction (relative to the z-axis), and thus this inclination angle 62 exactly corresponds to the angle by which a main ray 65 of a beam path of laser processing device 35 used for filamenting must be inclined in the x-direction to be incident perpendicular on surface 11.

Figure 6:
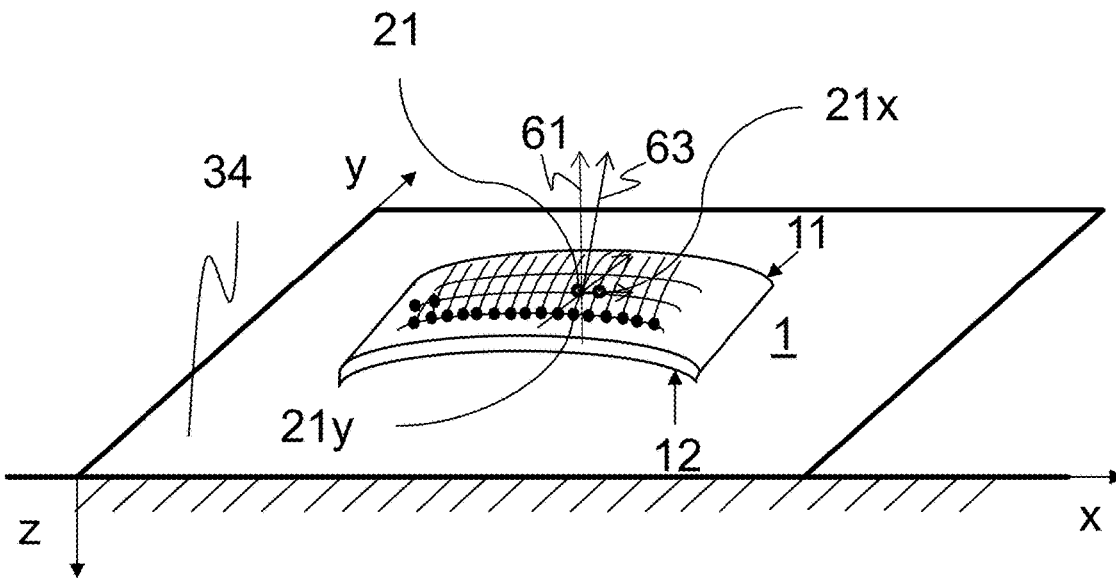

FIG. 6 shows the profile point 21y offset relative to a profile point 21 in the y-direction, by means of which the correction angle in the y-direction can be determined similarly as described above for the x-direction.

These correction angles can be assigned to each profile point 21 and are angles that represent the inclination of surface normal vector 63 relative to the z-direction in the y-direction and the inclination of surface normal vector 63 relative to the z-direction in the x-direction.

These inclination angles for each profile point 21 can be stored in computer 69 and can subsequently be used to correct the inclination of beam path 64 of the laser processing device 35 during filamentation.

With these correction angles, it is in particular also possible to ensure a perpendicular incidence of the beam path 64 onto surface 11 for each profile point 21 of the multitude of profile points in the direction of the respective normal vector 63 by causing the main ray 65 of the beam path 64 to be inclined by these correction angles and to be incident onto the respective profile point 21 associated with these correction angles.

Typical distances of profile points 21 to profile points 21x and to profile points 21y as used in the presently disclosed embodiments of the invention are about 3 to 5 μm, which also correspond to the raster spacing of the multitude of profile points 21 on surface 11.

By calculating the difference between the original, i.e. the uncorrected beam direction 61 and the normal direction 63 as described above, the correction angle in the x- and y-direction can be obtained, by which the vertical incidence of the laser beam has to be corrected at a specific position of the considered surface, here of surface 11, in particular as described above, in order to ensure perpendicular incidence of the laser beam for each profile point 21 on surface 11.

If the laser beam of beam path 64 of the laser processing device comprises not only parallel light, the direction of the highest intensity of laser light propagation of the laser beam is assumed as the direction of the beam path, which usually corresponds to the main ray of the beam path 64 and is denoted by reference numeral 65 in FIG. 3.

In a preferred embodiment, the local thickness of a workpiece 1 at the location of a profile point 21 can also be determined by the distance of a profile point 21 on surface 11 to the surface 12, preferably by measuring head 5, and the filaments 3 can be introduced into the workpiece 1 on the basis of this local thickness.

In a further preferred embodiment, the position of a scattering center in workpiece 1 can also be determined at the location of a profile point 21 by the distance of a profile point 21 on surface 11 to this scattering center, preferably by measuring head 5, and the filaments 3 can be introduced into workpiece 1 in dependence of a scattering center, in particular on the basis of the location of a scattering center. Here, scattering centers are not necessarily located below each profile point, which can be seen from the fact that in this case no further lower peak of a scattering center 59 will be determinable for this profile point.

FIG. 6 is a further view of a workpiece 1 that is distinguished by surfaces 11, 12 which are not plane-parallel. In the present case, the workpiece is a curved or warped sheet.

Preferably, the profile data of both surfaces 11, 12 are determined as described above in order to obtain, in this way, a surface contour model of workpiece 1, which is stored in computer 69 along with the corresponding location coordinates of the respective profile points 21 associated with surfaces 11 and 12.

This is preferably done by measuring along parallel measuring paths running next to each other preferably in the x- and/or y-direction, which allows to calculate a difference or differentiation in the x- and y-direction, i.e. along a scan line and perpendicular thereto.

In the next step, the respective inclination is determined using the computer 69, preferably as described above, in order to determine the corrected direction in the direction of the respective local surface normal vectors.

With the above-described calculation of the difference between the normal vectors and the uncorrected beam direction, which is the beam direction in parallel to the z-direction, this difference corresponding to the inclination of the tangents described above, the local correction angles are obtained associated with a respective profile point 21 and are stored in the computer 69 as described above.

With the respective correction angles it is possible to ensure, for each respective local profile point 21, perpendicular incidence of the laser radiation on the respectively considered surface 11, 12 at this profile point 21.

Within the scope of the invention, it is likewise possible to determine the above-described correction angles and the thickness of workpiece 1 only for profile points 21 that are located on the defined line of extension, or course line, of the filament zone.

Figures 7, 8:
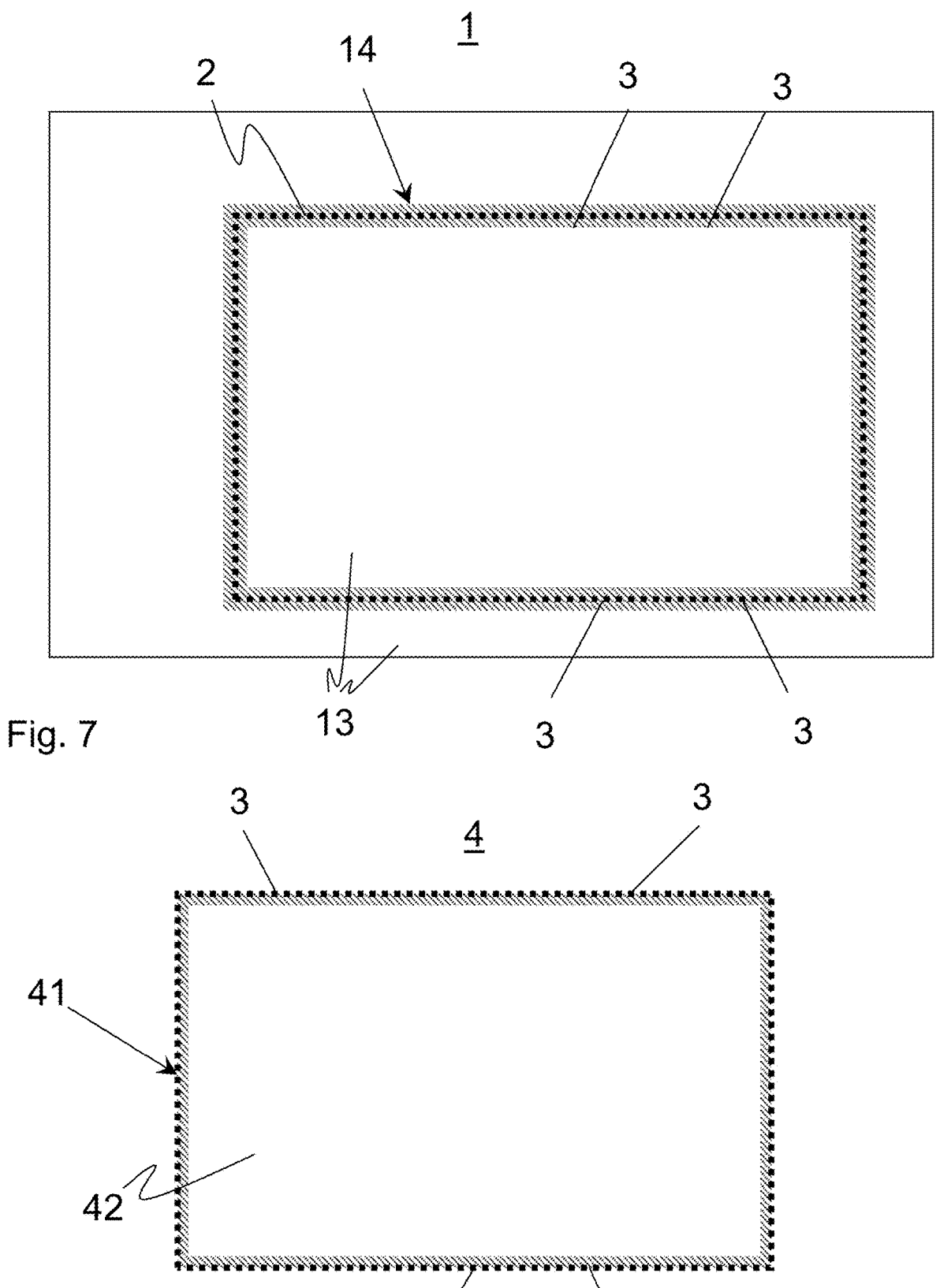
FIG. 7 is a schematic plan view of a workpiece into which a filament zone has been introduced.
FIG. 8 is a schematic plan view of a workpiece separated along a filament zone by the method according to the invention.

FIG. 7 schematically illustrates a workpiece 1 to be separated. Filaments 3 (not all of which are denoted with an own reference numeral) can be found in filament zone 2. Filament zone 2 represents the course of the line along which the filaments are arranged.

Around this filament zone, there is an area 14 which differs at least partially in terms of its properties from the other areas 13 of workpiece 1 which were not affected or altered by the formation of the of filaments 3. For example, the refractive index of the material may be altered within area 14 as compared to areas 13, or the density or phase content might have changed at least partially.

Workpiece 1 can be separated along filament zone 2 to obtain two new workpieces.

The contour illustrated in FIG. 7 is a rectangle, by way of example. However, the edges are usually not in the form of ideal sharp edges but have finite radii, which may be in the millimeter range, for example.

Furthermore, more generally and without being limited to the illustrated example, round or elliptical inner contours are possible as well, and also angular shapes with rounded edges.

It is also possible, although not shown, to form simple rectilinear or else curved lines along which a workpiece can be separated into two parts.

FIG. 8 is a schematic view, not drawn to scale, of such a new workpiece 4 obtained from a workpiece 1. This workpiece 4 has an edge 41 that was produced along filament zone 2 of the original workpiece 1. Accordingly, edge 41 is distinguished by the fact that the material of the workpiece 4 differs in this area at least partially from the remaining portion 42 of workpiece 4 in terms of its properties, for example with regard to phase content, refractive index, and/or density.

Referring now to FIG. 9 which schematically illustrates the generation of filaments in different depths of a workpiece 1 that does not have ideal plane-parallel surfaces 11, 12.

FIG. 9 shows a robotic arm 90 comprising movable, in particular selectively tiltable mirrors 80, 81 arranged therein, which are controlled by computer 69 to take a defined tilted position and thereby control the propagation direction of the beam path 64 of the laser processing device. For this purpose, mirrors 80, 81 are connected to the computer 69 via connection lines 82.

A laser 87 which is preferably arranged in the robotic arm 90 or fixedly connected to the robotic arm 90 is also controlled by computer 69 in order to emit defined individual pulses or bursts.

Also, the highly dispersive optical element 54 or the axicon as part of the beam shaping means is connected to this computer 69 via a connection line 82. For focusing the laser light, the dispersive optical element 54 or the axicon can be controlled to move in the longitudinal direction, as indicated by a double arrow.

This allows to generate defined focus points within the workpiece 1, preferably beneath defined profile points 21 with a pre-determinable depth in the workpiece 1.

Since the robotic arm 90 is configured to be translatable in the three spatial directions x, y, and z in a controlled manner and also to be pivotable in at least two spatial directions in a controlled manner, it is possible to adjust in a defined manner not only the exact position of the focal point but also the direction of the beam path and hence the direction of the main ray 65 of the laser processing device.

By applying the above-described method, the main ray 65 can be adjusted to be incident perpendicular onto the surface at a respective profile point 21 of the surface 11.

Furthermore, by tilting the mirror 80 in defined manner it is moreover possible to adjust the location at which the main ray 65 is incident on the highly dispersive optical element 54. If the main ray 65 is not incident in the center of the optical element 54 but laterally offset from the center, it is furthermore possible to influence the direction of this main ray 65 in which it exits from the optical element 54. For small inclinations, the dispersive optical element 54 can be held stationary in this case, and the focus of the beam and thus the direction of the main ray 65 can be inclined by using the lens laterally. Typically, inclination angles of up to about 3.6° can be generated in this way.

Furthermore, FIG. 9 shows a tiltable table 91 which can be displaced laterally in the x- and y-directions and is configured to be pivotable around the x- and y-directions.

In order to translate the upper part 92 of the tiltable table 91 relative to the lower part 93 thereof in the x-direction, a translator 94 is provided which is also connected to the computer 69 via a connection line 82.

Another translator (not shown in FIG. 9) similarly generates a translation of the upper part 92 relative to the lower part 93 in the y-direction.

The tiltable table can not only be moved in its position with respect to the z-direction by translators 95, 96, and 97, which are also controlled by the computer 69 via connection lines 82, but can also be tilted in a defined manner. For this purpose, translator 97 is mounted to the tiltable table 1 so as to be offset in the y-direction relative to translators 95 and 96 resulting in a three-point bearing, which does not only allow for a defined dissipation of the tiltable table in the z-direction but also defined pivoting of the tiltable table around the y- and x-axes.

In this way, it is in particular also possible, for producing the filaments 3 in workpiece 1, to move the tiltable table instead of or in addition to a movement of the dispersive optical element.

According to this preferred embodiment, it is thus possible for producing the point of incidence of the laser beam along the defined course of the course line, to move the laser beam in particular with its main ray 65, and/or the workpiece 1.

In a particularly preferred embodiment, the tiltable table 1 is configured to be pivotable around a fixed point in space, preferably around a profile point 21 of the workpiece 1 provided on the tiltable table, and in this way it is capable of independently providing all the necessary movement processes for producing filaments 3 along filament zone 2.

FIG. 10 shows a further embodiment of a robotic arm 90 of a laser processing device 35 that differs from the embodiment of the robotic arm 90 as shown in FIG. 9 only in that a light guide 88 is used instead of mirrors 80 and 81 for guiding the light of laser 87, for example a light guide in the form of photonic-crystal fibers (i.e. microstructured hollow core fibers) which is suited to be permanently operable in particular for the light of the employed ultrashort pulse laser 87 and guides this light into the highly dispersive optical element 54 or into an axicon.

FIG. 11 shows, highly schematically, yet another embodiment of a robotic arm 90 of a laser processing device 35, which differs from the embodiment of robotic arm 90 as shown in FIG. 9 only in that an interiorly mirrored robotic arm 35 is used instead of mirrors 80 and 81 for guiding the light of laser 87, which is particularly suited to be permanently operable in particular for the light of the employed ultrashort pulse laser 87 and guides this light into the highly dispersive optical element 54 or into an axicon by back-reflection on its inner surface 89, which is illustrated in FIG. 9 only in highly simplified manner.

Thus, the apparatuses described above, in particular for carrying out a method as described above and preferably for producing and separating a dielectric workpiece, each comprise a light source, in particular a laser light source 87; a device for providing a workpiece 1, for example in the form of a tiltable table 91; and a device for relative movement of the beam path 64 of light source 87 relative to workpiece 1, comprising the above-described translators 94, 95, 96 and the translator for displacing the upper part 92 of tiltable table 91 in the y-direction (not shown in FIG. 9), and the robotic arm 90; means for controlling the relative movement of beam path 64 of the light source relative to workpiece 1, provided in the form of computer 69; and means for determining the surface contour, and/or the thickness of workpiece 1, and/or scattering centers in workpiece 1, preferably by optical measurement, comprising the translatable measuring head 5 as a confocal optical sensor.

In all the computer assisted processes described above, either the computer 69 or a plurality of preferably cooperating computers may be used.

It is also within the scope of the invention to not carry out all method steps successively as described above, but to first perform the determining of the surface contour, the thickness, or of scattering centers independently, by one of confocal optical measurement, laser triangulation, light-section technology, two-dimensional interferometric techniques, and then to perform the filamenting at a later point in time on the basis of the determined data.

| LIST OF REFERENCE NUMERALS | |
|---|---|
| 1 | Workpiece |
| 11 | Surface facing the laser |
| 12 | Surface facing away from the laser |
| 13 | Area outside the filament zone |
| 14 | Area within the filament zone |
| 2 | Filament zone |
| 3 | Filament |
| 4 | Workpiece produced by filamentation |
| 5 | Measuring head |
| 21 | Profile point |
| 31, 32, 33 | Filaments in different depths of the workpiece |
| 34 | Reference surface |
| 35 | Laser processing device |
| 41 | Edge produced by filamentation |
| 42 | Portion outside the edge zone |
| 51 | Polychromatic light source |
| 52 | Aperture |
| 53 | Semi-transparent mirror |
| 54 | Highly dispersive optical element or axicon |
| 55 | Spectrometer |
| 56 | Spectrum |
| 57 | Peak |
| 58 | Peak |
| 59 | Lower peak of a scattering center |
| 60 | Tangent to workpiece surface |
| 61 | Uncorrected beam direction |
| 62 | Correction angle |
| 63 | Direction of surface normal vector |
| 64 | Beam path of laser processing device |
| 65 | Main ray of the beam path of laser processing device |
| 69 | Computer |
| 80 | Selectively tiltable mirror |
| 81 | Selectively tiltable mirror |
| 82 | Connection lines |
| 87 | Laser |
| 88 | Light guide |
| 89 | Inner surface of robotic arm 90 |
| 90 | Robotic arm |
| 91 | Tiltable table |
| 92 | Upper part of tiltable table |
| 93 | Lower part of tiltable table |
| 94 | Translator |
| 95 | Translator |
| 96 | Translator |
| l | Length of a filament |

-continued

| LIST OF REFERENCE NUMERALS | |
| --- | --- |
| d | Thickness of workpiece |
| x, y, z | Spatial directions |

What is claimed is:

1. A dielectric workpiece comprising:

a plurality of boundary surfaces delimiting the workpiece;

the workpiece has a thickness between 0.5 and 20 mm, wherein the thickness varies spatially and/or at least one of the boundary surfaces has at least one curvature with a radius of curvature between 0.1 µm and 10 m, the workpiece has an edge having a roughness RMS from 1 to 5 µm determined by a roughness measurement using an atomic force microscope and/or a white light interferometer, wherein the edge has a material with a material property that differs from a remaining portion of the workpiece, wherein the edge is formed by determining a vector standing orthogonally on a local surface that is the mathematical surface normal vector so that a filament of the dielectric workpiece is aligned at an angle that is represented by the surface normal vector, wherein the filament is formed of a cavity, wherein the filament is a plurality of filaments that are produced in different height sections of the workpiece, and wherein one of the plurality of filaments has a starting point that is also an end point of another produced filament of the plurality of filaments, and wherein the starting point of the one of the plurality of filaments is identified by a scattering center in the workpiece.

2. The dielectric workpiece of claim 1, wherein the material property is selected from the group consisting of phase content, refractive index, density, and any combinations thereof.

3. The dielectric workpiece of claim 1, wherein the workpiece is glass.

4. The dielectric workpiece of claim 3, wherein the glass is an aluminosilicate or borosilicate glass.

5. The dielectric workpiece of claim 1, wherein the workpiece has a wedge-like shape.

6. The dielectric workpiece of claim 1, wherein the workpiece is an ampoule or a tube.

7. The dielectric workpiece of claim 1, wherein the workpiece is a curved or warped sheet or exhibits waviness.

8. The dielectric workpiece of claim 1, wherein the plurality of boundary surfaces are two delimiting surfaces that are not formed parallel to each other.

9. The dielectric workpiece of claim 8, wherein the workpiece has an irregular gradient.

10. The dielectric workpiece of claim 1, wherein the thickness of the workpiece that is delimited by the boundary surfaces that are not plane-parallel to each other and vary along an extension of the workpiece.

11. The dielectric workpiece of claim 1, wherein at least one of the plurality of boundary surfaces exhibit curvature.

12. The dielectric workpiece of claim 1, wherein the workpiece is formed so that a lateral extension of the boundary surfaces delimiting it is greater by at least one order of magnitude than its thickness.

13. The dielectric workpiece of claim 1, wherein the workpiece is in the form of a slice in which a structure has been introduced on a surface of the boundary surfaces in order to optimize reflection properties of the workpiece that is a pyramidal structure.

14. The dielectric workpiece of claim 1, wherein the workpiece is a rectangle with edges that have finite radii in the millimeter range.

15. The dielectric workpiece of claim 1, wherein the workpiece has an angular shape with rounded edges.

16. The dielectric workpiece of claim 1, wherein the material property is phase content.

17. The dielectric workpiece of claim 1, wherein the material property is refractive index.

18. The dielectric workpiece of claim 1, wherein the material property is density.

19. The dielectric workpiece of claim 1, wherein the filament is formed of a tubular cavity.

* * * * *